UNITED STATES PATENT OFFICE.

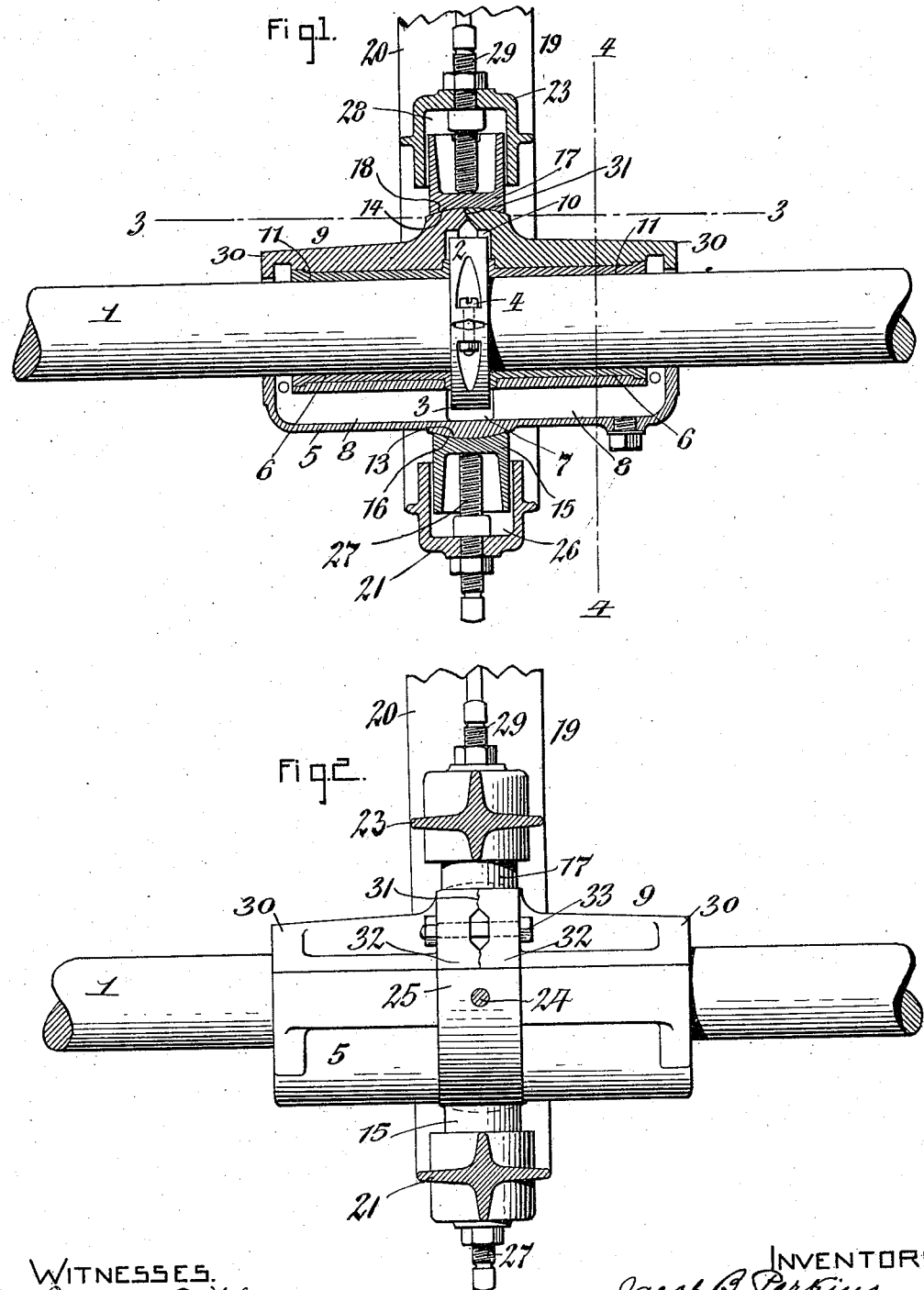

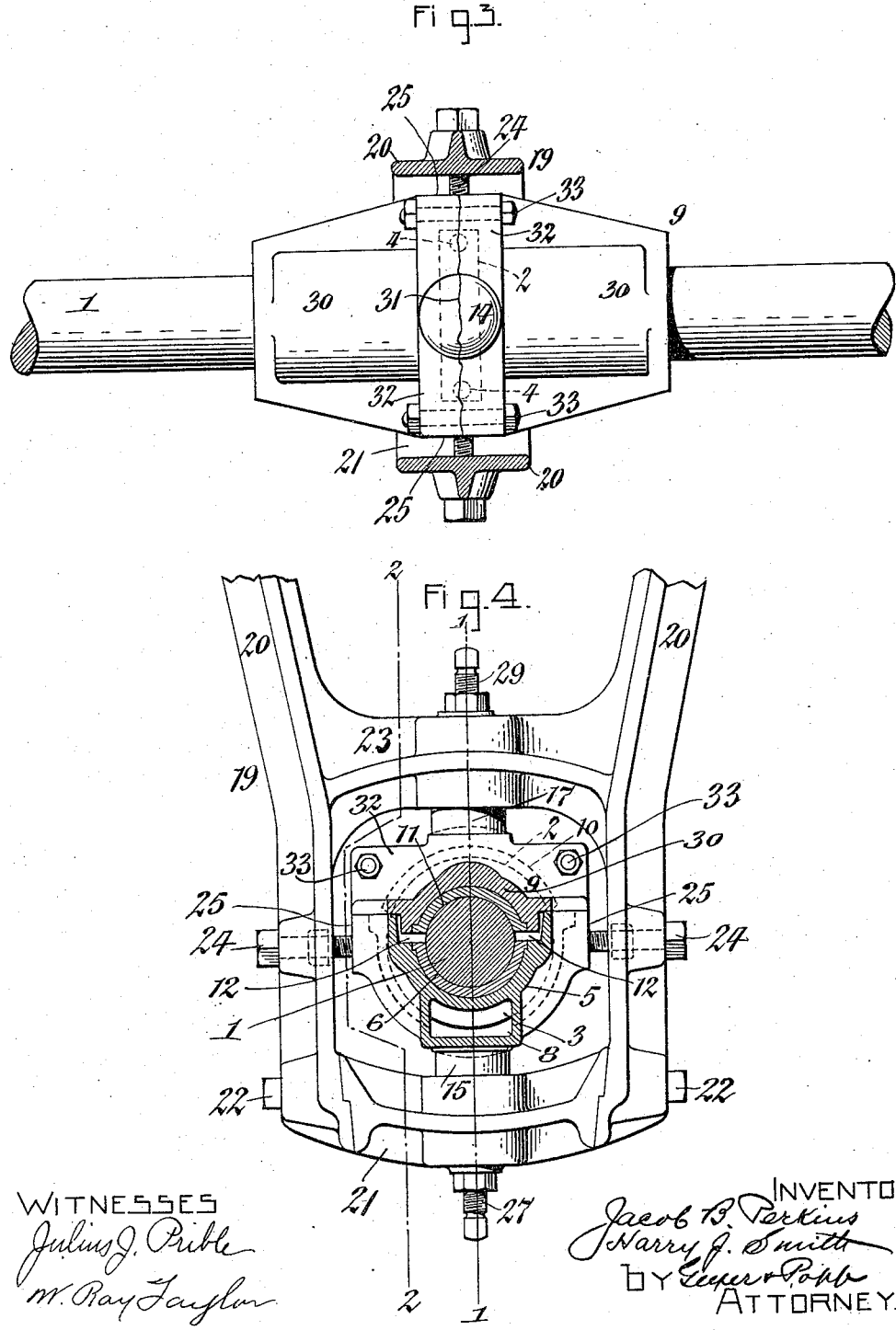

JACOB B. PERKINS, OF CLEVELAND, AND HARRY J. SMITH, OF LAKEWOOD, OHIO, ASSIGNORS TO THE HILL CLUTCH COMPANY, OF CLEVELAND, OHIO, A CORPORATION OF OHIO.

SHAFT-BEARING.

1,184,011.  Specification of Letters Patent.  Patented May 23, 1916.

Application filed July 7, 1914. Serial No. 849,410.

*To all whom it may concern:*

Be it known that we, JACOB B. PERKINS and HARRY J. SMITH, citizens of the United States, residing at Cleveland and Lakewood, respectively, in the county of Cuyahoga and State of Ohio, have invented new and useful Improvements in Shaft-Bearings, of which the following is a specification.

This invention relates generally to an oiling bearing in which the bearing base and cap are mounted by a ball and socket joint on the supporting frame or hanger and more particularly to a bearing of this type in which the shaft is provided with an oiling ring or collar which forms part of the means for distributing the lubricating oil over the journals of the bearing and taking up the longitudinal thrust on the shaft. In that type of such bearings heretofore in use known as "long coupled" sufficient space was provided between the top of the cap and the upper bridge of the supporting frame to permit the cap to be lifted off from the collar of the shaft and then removed lengthwise of the shaft from between the latter and supporting frame and still permit this bearing cap to be formed in one piece. It is desirable, however, for greater security, strength and durability to "close couple" the bearing and the supporting frame by bringing the upper bridge of the frame close down to the upper side of the bearing cap that the latter cannot be removed axially from the shaft inasmuch as this cap embraces the upper part of the oiling collar, and it therefore becomes necessary to move the shaft bodily in the direction of its axis together with the oiling collar and bearing cap and base sufficient to clear the supporting frame before the cap can be lifted from the shaft and collar in order to afford access to the latter.

Our improvement is designed to permit of short coupling or close coupling the supporting frame and bearing cap and base and still permit of removing the bearing cap from the shaft and collar as well as assembling the parts in the reverse order in the same manner without necessitating moving the shaft lengthwise in the supporting frame, thereby enabling the shaft to be mounted and dismounted with greater ease, facility and convenience and also permitting of inspecting, adjusting or repairing the same more readily and conveniently.

In the accompanying drawings: Figure 1 is a vertical longitudinal section of a shaft having an oiling ring or collar and mounted in a bearing which is constructed in accordance with our invention, the section being taken in line 1—1, Fig. 4. Fig. 2 is a vertical longitudinal section of the same taken in line 2—2, Fig. 4. Fig. 3 is a horizontal section taken in line 3—3, Fig. 1. Fig. 4 is a vertical transverse section taken in line 4—4, Fig. 1.

Similar characters of reference indicate corresponding parts throughout the several views.

1 represents the shaft which is arranged horizontally and provided with a ring or collar which is preferably constructed in two semi-circular sections 2, 3 and clamped against opposite sides of the shaft so as to form a complete ring or collar which turns with the shaft, the connection between these ring sections being preferably effected by means of bolts 4 which connect the corresponding ends of the oiling ring sections on opposite sides of the shaft, as shown by full lines in Fig. 1 and by dotted lines in Fig. 3.

5 represents the base of the bearing which is provided with lower journals 6, 6 engaging with the underside of the shaft on opposite sides of the oiling ring or collar and also with a circumferential groove 7 between the journals and with an oil reservoir 8 which extends from the groove 7 to the opposite ends of the base. The lower part of the oiling ring is arranged in the groove 7 and its opposite sides engage with the inner ends of the journals 6, 6.

9 represents the cap of the bearing which is provided on its inner side about midway of its length with a circumferential groove 10 which receives the upper part of the oiling ring or collar and on opposite sides of this groove with journals 11, 11 which engage with the opposite sides of the oiling ring and the adjacent upper peripheral portions of the shaft on opposite sides of said ring. This bearing therefore serves the double purpose of supporting the shaft during its rotary movement and also as a thrust bearing to hold the same against lengthwise or axial movement. During the rotary movement of the ring or collar the same picks up the oil in the lower groove 7 between the lower journals 6, 6 and delivers the same into the upper groove 10 of the cap from which last mentioned groove the oil flows through longitudinal channels 12, 12 formed between the opposing edges of the cap and base where the same comes into contact with the periphery of the shaft for lubricating the latter and the journals while the surplus returns to the reservoir, in the manner shown and described in the application for patent of H. J. Smith, filed August 7, 1908, Serial #447,374.

On its underside the bearing base is provided about midway of its length in a convex bearing face 13 and on the upper side of the bearing cap the latter is provided about midway of its length with a convex bearing face 14, said bearing faces of the base and cap being concentric and together forming parts of the surface of a ball or sphere.

15 represents a lower trunnion provided at its upper end with a concave bearing face 16 which engages with the convex bearing face of the base and 17 represents an upper trunnion provided at its lower end with a concave bearing face 18 which engages with the convex bearing face of the cap, as shown in Figs. 1 and 4.

19 represents a supporting member or frame which is preferably constructed in the form of a hanger and which comprises two upright side bars or arms 20, 20 arranged on opposite sides of the bearing cap and base, a lower bridge 21 arranged transversely below the bearing base and preferably detachably connected with the lower ends of the hanger bars or arms by means of screws 22, or otherwise, and an upper bridge 23 arranged transversely above the bearing cap and preferably formed integrally with the hanger bars or arms. Between the upper and lower bridges the hanger bars are provided with retaining screws 24 which engage with vertical faces 25 on horizontally opposite sides of the bearing base for holding and adjusting the same horizontally and laterally in the proper position within the supporting frame. The lower bridge of the supporting frame is provided with an upwardly opening socket 26 which receives the lower trunnion and in the bottom of this socket is arranged a vertical adjusting screw 27 which engages with the lower trunnion and operates to adjustably support the latter in its proper vertical position together with the parts mounted thereon. The upper trunnion is arranged in a downwardly opening socket 28 formed in the upper bridge of the supporting frame and is held adjustably in engagement with the upper convex bearing face by means of a vertical adjusting and clamping screw 29 bearing against the upper trunnion and mounted in the upper bridge.

The space between the upper and lower bridges and the opposing parts of the cap and case is so close that if the bearing cap were made in one piece, as has been customary heretofore, it would be necessary in mounting the shaft with its collar to first apply the base and cap to the shaft and its collar while the shaft and collar are withdrawn axially from the supporting frame and the unmounting of the shaft would be similarly effected by first moving the shaft with the collar and bearing cap and base axially out of the supporting frame. This is objectionable on account of the inconvenience, labor and time consumed in thus manipulating the parts.

In order to facilitate the mounting of the shaft and its collar in the bearing and also rendering the same more convenient for inspection, adjustment and repairs after the same are mounted, the bearing cap is divided into two sections 30, 30 the division between these sections being arranged transversely of this cap and preferably so that the division line or joint 31 between the same extends crosswise of this cap through the convex face thereof and transversely in line with the oiling ring or collar on the shaft and the groove 7 of this cap, as shown in Figs. 1, 2 and 3. On opposite sides of this joint between the sections of the bearing cap these sections are provided with transverse flanges or lugs 32, 32 which are adapted to be connected with each other by horizontal longitudinal bolts 33 arranged on opposite sides of the cap, as shown in Figs. 2, 3 and 4, or by any other suitable means, so that when the sections of the cap are thus connected the same form practically one piece and operate when the shaft is mounted to receive the thrust of the oiling collar. The sections of this cap are preferably cast in one piece by using a splitting core in the mold and after the cap has been completely babbitted and machined, the same is divided into two pieces by cracking the same transversely about midway between the ends thereof to form the transverse joint, this being preferably effected by the blow of a hammer and a splitting wedge.

In mounting a shaft with an oiling collar or ring in a bearing embodying this invention the supporting frames or hangers are first mounted or suspended on the wall or ceiling of the building and the alinement of the same verified in three directions so that they are plumb and also horizontally and vertically in the proper position relatively to each other. The shaft is then elevated to its approximate position in the spaces between the frame arms below the upper bridges thereof after which the lower bridges are secured to the lower ends of the frame bars. The split collar or ring associated with each bearing is then secured loosely to the shaft adjacent to one side of the companion supporting frame, the bearing base is applied to the underside of the shaft and one of the collars and then the bearing base together with the collar are moved axially along the shaft until the base and collar are in such a position within the supporting frame that the convex face of the bearing base is vertically in line with the lower trunnion. The side screws of the hanger frame are now tightened against opposite vertical sides of the bearing base, the clamping screws of the collar or ring are tightened by means of a bent screw driver or other suitable tool, so as to permanently or fixedly secure this ring or collar to the shaft. The two sections of the bearing cap are now moved axially toward each other from opposite sides of the supporting frame so that the inner ends of these cap sections engage with each other and the journals thereof engage with opposite sides of the oiling ring or collar and the adjacent upper surface of the shaft, in which position these sections of the bearing cap are retained relatively to each other so that they practically form one piece by means of the connecting bolts 33. The upper trunnion is now lowered into engagement with the convex face of the bearing cap and held in place relatively thereto by tightening the upper clamping screw which is mounted in the upper bridge of the companion supporting frame. The bearing is now completely assembled with the shaft and its collar and these parts are in their proper working condition.

When it is desired to dismount the shaft or to adjust or inspect the bearing it is only necessary to loosen the upper trunnion clamping screw 29 and to remove the bolts 33 which connect the bearing cap sections after which the two halves of the cap may be moved outwardly lengthwise of the shaft in opposite directions and the oil ring loosened or tightened as the case may be by means of a screw driver or similar instrument after which the cap sections may be again assembled in the manner previously described.

It will be obvious from the foregoing that the advantages of a close coupled ball and socket collar oiling bearing are obtained in this improved construction without any of the inconveniences or disadvantages attending the use of this form of bearing as heretofore constructed, but on the contrary this improved bearing possesses all the advantages of the long coupled bearings of this character and none of the disadvantages of the latter and without any material increase in cost of manufacture.

We claim as our invention.

1. A bearing for collar oiling shafts, comprising a support, a base mounted on the lower part of said support and adapted to receive the underside of the shaft and its collar and a cap mounted on the upper part of said support and receiving the upperside of said shaft and being provided on its under side with a groove which receives said collar, said cap being divided transversely in line with said groove and collar so as to be removable axially relatively to said shaft from opposite sides of said collar.

2. The combination of a shaft having a collar, a bearing base or lower bearing section which receives the underside of said shaft and its collar, a bearing cap which receives the upper side of said shaft and is provided on its under side with a groove which receives said collar and which is divided into sections transversely in line with said groove and collar, means for connecting said cap sections, and a support on which said bearing cap and base are mounted.

3. The combination of a shaft having a collar, a bearing base or lower bearing section which receives the underside of said shaft and its collar, a bearing cap which receives the upper side of said shaft and is provided on its underside with a groove which receives said collar and which is divided into sections transversely in line with said groove and collar, bolts connecting the sections of said bearing cap, and a support on which said cap and base are mounted.

4. The combination of a shaft, an oiling collar arranged on said shaft, a bearing base which receives the underside of said shaft and collar and which is provided on its underside with a convex face, a bearing cap which receives the upper side of said shaft and is provided on its underside with a groove which receives said collar and is provided on its upper side with a convex face and is divided into sections transversely in line with said grooves and collar, means for connecting said bearing cap sections, and supporting means having concave faces engaging with said convex faces.

5. The combination of a shaft, an oiling collar arranged on said shaft, a bearing base which receives the underside of said shaft and collar and which is provided on its underside with a convex face, a bearing cap which receives the upper side of the shaft and is provided on its underside with a groove which receives said collar and is provided on its upper side with a convex face and is divided into sections transversely in line with said collar, a lower trunnion provided on its upper end with a concave face which receives the convex face of the bearing base, an upper trunnion provided on its lower end with a concave face which engages with the convex face of the bearing cap, and a supporting frame having a lower bridge on which the lower trunnion is mounted and an upper bridge on which the upper trunnion is mounted.

Witness our hands this 30th day of June, 1914.

JACOB B. PERKINS.
HARRY J. SMITH.

Witnesses:
FRED W. SEBELIN,
M. G. FIRESTONE.